(12) United States Patent
Maier

(10) Patent No.: US 6,755,048 B2
(45) Date of Patent: Jun. 29, 2004

(54) SOLENOID VALVE

(75) Inventor: Roland Maier, Neresheim (DE)

(73) Assignee: BSH Bosch und Siemens Hausgerate GmbH, Munich (DE)

( * ) Notice: Subject to any disclaimer, the term of this patent is extended or adjusted under 35 U.S.C. 154(b) by 0 days.

(21) Appl. No.: 10/462,237

(22) Filed: Jun. 16, 2003

(65) Prior Publication Data

US 2003/0221443 A1 Dec. 4, 2003

Related U.S. Application Data

(63) Continuation of application No. PCT/EP01/14717, filed on Dec. 13, 2001.

(30) Foreign Application Priority Data

Dec. 15, 2000 (DE) .......................... 100 62 666

(51) Int. Cl.[7] ................................................ F25B 43/00
(52) U.S. Cl. .......................... 62/474; 137/544; 137/550
(58) Field of Search ................... 62/474, 475; 137/544, 137/550

(56) References Cited

U.S. PATENT DOCUMENTS

| | | | | |
|---|---|---|---|---|
| 2,463,892 A | * | 3/1949 | Martin | 137/340 |
| 2,649,112 A | * | 8/1953 | Barnett et al. | 137/555 |
| 3,916,947 A | * | 11/1975 | Holmes et al. | 137/544 |
| 4,982,578 A | * | 1/1991 | Heffner et al. | 62/475 |
| 5,582,022 A | * | 12/1996 | Heinrichs et al. | 62/175 |
| 6,044,649 A | * | 4/2000 | Numoto et al. | 62/114 |
| 6,293,125 B1 | * | 9/2001 | Cole et al. | 62/475 |

* cited by examiner

Primary Examiner—William E. Tapolcai
(74) Attorney, Agent, or Firm—Laurence A. Greenberg; Werner H. Stemer; Ralph E. Locher

(57) ABSTRACT

To prevent foreign particles from entering the inlet of a solenoid valve during assembly in a coolant circuit, a particle filter is connected upstream of the inlet.

20 Claims, 1 Drawing Sheet

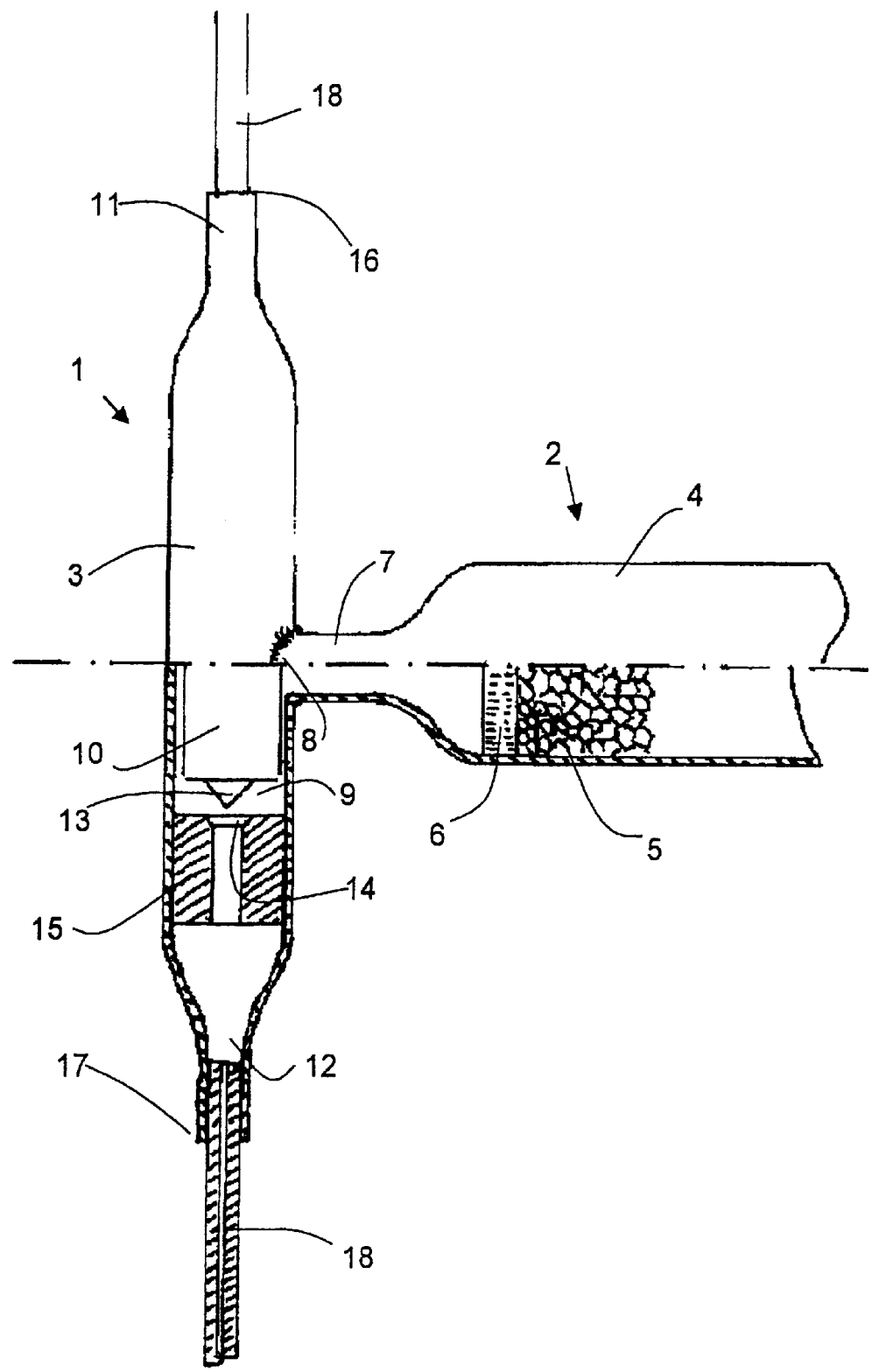

SOLENOID VALVE

CROSS-REFERENCE TO RELATED APPLICATION

This application is a continuation of copending International Application No. PCT/EP01/14717, filed Dec. 13, 2001, which designated the United States and was not published in English.

BACKGROUND OF THE INVENTION

Field of the Invention

The present invention relates to a solenoid valve, in particular, a solenoid valve for the refrigerant circuit of a refrigerator.

Such solenoid valves are usually purchased as finished parts by the refrigerator manufacturers and are mounted in the refrigerant circuit. The purchased solenoid valves are, conventionally, provided at inlets and outlets with a protective cap that prevents the penetration of foreign bodies into the valve before the valve is installed. In the production run, however, it is necessary for these caps to be removed. As a result, dirt may penetrate into the valve. This possibility presents a considerable problem to the refrigerator manufacturer because such contamination mostly does not lead immediately to the failure of the valve so that detection would still be possible in the factory by quality control, but, instead, such a solenoid valve often still carries out a large number of switching operations correctly before such a dirt particle reaches a point where it may impair or block the switching action of the valve and causes a fault. Such faults are costly and complicated to eliminate because they, generally, occur only at the refrigerator end-user. Thus, to eliminate the faults, a service technician has to visit the user.

SUMMARY OF THE INVENTION

It is accordingly an object of the invention to provide a solenoid valve that overcomes the hereinafore-mentioned disadvantages of the heretofore-known devices of this general type and that provides a solenoid valve, in particular, for a refrigerant circuit of a refrigerator, but not solely for such a purpose, in which the penetration of foreign bodies into the valve is virtually ruled out even during the mounting of the valve.

With the foregoing and other objects in view, there is provided, in accordance with the invention, a solenoid valve for a refrigerant circuit, including a hollow body having an inlet for receiving refrigerant and at least one outlet for discharging the refrigerant, and a particle filter fluidically communicating with the inlet. According to the invention, therefore, the inlet of the solenoid valve is preceded by a particle filter.

In accordance with another feature of the invention, preferably, the solenoid valve is connected to a refrigerant drier, to form a structural unit, and the particle filter is part of the refrigerant drier. Such a structural unit can be prefabricated separately as a structural unit and inserted in a refrigerant circuit during assembly in exactly the same way as the solenoid valve or the refrigerant drier hitherto. By the solenoid valve and the drier being connected to form a structural unit, the number of parts of such a refrigerant circuit and, consequently, also the labor necessary for assembly and the costs associated therewith are reduced.

Alternatively, the particle filter may be formed by a fine or sintered sieve. In accordance with a further feature of the invention, it is particularly advantageous when the particle filter is a fine or sintered sieve that, as part of the refrigerant drier, prevents an escape of the usually granular refrigerant drier from the latter.

A refrigerant drier, conventionally, has a substantially tubular housing that, during the mounting of the refrigerant circuit, is connected to the solenoid valve through an intermediate pipeline. By contrast, according to the invention, the tube that forms the one-part housing of the refrigerant drier is connected directly at one end to the inlet of the solenoid valve.

In accordance with an added feature of the invention, the refrigerant drier has a drying agent chamber and the particle filter is disposed between the drying agent chamber and the inlet.

To make it easier to connect the drier to the solenoid valve, in accordance with an additional feature of the invention, the housing of the valve is, preferably, narrowed by forming toward its end to be connected to the inlet of the solenoid valve. Thus, the narrowed end can be inserted in a lateral orifice of the housing of the solenoid valve and fastened easily, for example, by soldering.

In accordance with yet another feature of the invention, the solenoid valve, itself, may have, as well, a tubular housing that is narrowed toward each of its ends that forms an outlet. Exactly as in the case of the housing of the refrigerant drier, this narrowing is, preferably, produced by forming after the insertion of all the necessary components into the interior of the tube.

The outlets of the solenoid valve are less at risk from the penetration of dirt or foreign particles than the inlet because foreign particles that have penetrated into an outlet tend, during the operation of the refrigerant circuit, to be flushed out of the solenoid valve and be trapped at the particle filter, at the latest, after one passage through the refrigerant circuit. In order, nevertheless, even here, to combat the penetration of foreign particles, it may be expedient to configure one outlet of the solenoid valve as a capillary. Such a capillary, which, preferably, extends over a length of several centimeters, may, at the same time, be used as a device for expanding the refrigerant that enters the solenoid valve under high pressure. By the possibility of connecting the downstream end of such a capillary directly to the evaporator of the refrigerant circuit, the construction of the latter is further simplified.

With the objects of the invention in view, in a refrigerant circuit, there is also provided a solenoid valve including a hollow body having an inlet for receiving refrigerant and at least one outlet for discharging the refrigerant, and a particle filter fluidically communicating with the inlet.

With the objects of the invention in view, there is also provided a solenoid valve for a refrigerant circuit, including a hollow body having an inlet for receiving refrigerant and at least one outlet for discharging the refrigerant, a particle filter fluidically communicating with the inlet, and a valve body disposed inside the body for selectively opening and closing the at least one outlet.

With the objects of the invention in view, there is also provided a solenoid valve for a refrigerant circuit, including a hollow body having an inlet for receiving refrigerant and at least one outlet for discharging the refrigerant, a particle filter sieve fluidically communicating with the inlet, a valve body disposed inside the body for selectively opening and closing the at least one outlet, and a refrigerant drier fluidically communicating with the inlet, the refrigerant drier and the body forming a structural unit, the particle filter sieve being part of the refrigerant drier.

Other features that are considered as characteristic for the invention are set forth in the appended claims.

Although the invention is illustrated and described herein as embodied in a solenoid valve, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

BRIEF DESCRIPTION OF THE DRAWING

The FIGURE is a fragmentary, cross-sectional view of a structural unit with a solenoid valve and a refrigerant drier according to the invention.

DESCRIPTION OF THE PREFERRED EMBODIMENTS

Referring now to the single FIGURE of the drawing, it is seen that a structural unit has a solenoid valve 1 and with a refrigerant drier 2 that are provided for installation in a refrigerant circuit of a combination refrigerator. The solenoid valve 1 and the refrigerant drier 2 have, in each case, a one-part tubular housing 3 and 4 that, in each case, has been cut from a copper tube of constant diameter and, after the insertion of the fittings necessary for functioning, has been narrowed at its ends. The housing 4 of the refrigerant drier 2 is largely filled with a granular drier material 5. A particle sieve 6 at the downstream end 7 of the housing 4 extends transversely through the housing 4 and prevents the passage of drier material 5 and of foreign particles that, during mounting into the housing 4, may possibly enter the interior of the solenoid valve 1 at an end located opposite the end 7 and not illustrated in the FIGURE.

The narrowed end 7 of the drier housing 4 is inserted into a lateral bore of the valve housing 3 and is soldered therein. This bore forms the inlet 8 of the solenoid valve 1. It issues onto a chamber 9, in which a valve member 10 is moveable back and forth in the longitudinal direction of the housing 3, under the action of magnets not shown in the FIGURE, between two end positions that correspond, in each case, to the connection of the inlet 8 to one of the two outlets 11, 12 of the solenoid valve 1. The configuration and action of the magnets are not described in detail here because they are not the subject of the present invention. The operation of such a solenoid valve is described, for example, in German Published, Non-Prosecuted Patent Application DE 37 18 490 A1.

The FIGURE of the drawing shows the valve member 10 in a position in which a sealing cone 13 of the valve member 10 is at a distance from a confronting valve seat 14 at one longitudinal end of the chamber 9 and, thus, allows the flow of refrigerant from the inlet 8 to the outlet 12, whereas another sealing cone 13, not shown in the FIGURE, bears sealingly at the opposite end of the valve member 10, against a corresponding valve seat associated with this end and, thus, blocks the passage of refrigerant to the outlet 11. By displacing the valve member 10 downward with regard to the view of the FIGURE, the passage to the outlet 12 is blocked and to the outlet 11 is opened.

The solenoid valve 1 can be assembled in a simple way: a first hollow-cylindrical body 15 carrying a valve seat 14, the valve member 10, and a second body 15 are introduced in succession into a tubular piece 3 so as to leave a freedom of movement of the valve member 10. Subsequently, the tubular piece 3 is pressed together, level with the hollow-cylindrical body 15 to give the body 15 a firm hold in the tubular piece 3, and, thereafter, the ends 16, 17 of the tubular piece that project beyond the hollow-cylindrical bodies 15 are narrowed into the shape shown in the FIGURE. An outlet pipeline 18 is, subsequently, inserted into the narrowed ends 16, 17 and is soldered sealingly. The outlet pipeline 18 is, preferably, a capillary 18 that serves as a way for expanding the refrigerant after its passage through the refrigerant drier 2 and the solenoid valve 1 and before the refrigerant's entry into a non-illustrated evaporator of the refrigerant circuit. As a consequence of the small inside diameter of the capillary (which is typically a few hundred $\mu$m in a household refrigerator) and of its length being of typically 10 cm and more, during the mounting of the structural unit of the solenoid valve 1, capillaries 18, and a refrigerant drier 2 in a refrigerant circuit, penetration of foreign particles through the temporarily open free end of the capillary and reaching the solenoid valve is virtually ruled out.

As a result of an alternative refinement, the inlet 8 of the solenoid valve can also be protected against the penetration of foreign particles by being preceded by an individual particle sieve that is not at the same time part of the drier. Such a particle sieve may, for example, be pushed into a pipeline of constant cross-section preceding the inlet 8 and be pressed therein.

The invention is not, of course, restricted to solenoid valves with two outlets; the valve protected by the particle sieve may also have a single outlet or more than two.

I claim:

1. A solenoid valve for a refrigerant circuit, comprising:
   a hollow body having:
      an inlet for receiving refrigerant; and
      two outlets for discharging the refrigerant; and
      a particle filter fluidically communicating with said inlet.

2. The solenoid valve according to claim 1, further comprising a refrigerant drier if fluidically communicating with said inlet, said refrigerant drier and said body forming a structural unit, said particle filter being part of said refrigerant drier.

3. The solenoid valve according to claim 1, wherein said particle filter is a fine sieve.

4. The solenoid valve according to claim 1, wherein said particle filter is a sintered sieve.

5. The solenoid valve according to claim 2, wherein:
   said refrigerant drier has a drying agent chamber; and
   said particle filter is disposed between said drying agent chamber and said inlet.

6. The solenoid valve according to claim 5, wherein said refrigerant drier has a one-part tube-shaped housing with at least one end and Bald end of said tube is connected to said inlet.

7. The solenoid valve according to claim 6, wherein said housing narrows toward said end.

8. The solenoid valve according to claim 6, wherein said housing is narrowed by forming toward said end.

9. The solenoid valve according to claim 1, wherein:
   said body is a tubular housing with two ends;
   said two outlets are respectively disposed at each of said two ends; and
   said body narrows toward each of said two ends.

10. The solenoid valve according to claim 1, wherein at least one of said outlets is a capillary.

11. In a refrigerant circuit, a solenoid valve comprising:
a hollow body having:
   an inlet for receiving refrigerant; and
two outlets for discharging the refrigerant; and
a particle filter fluidically communicating with said inlet.

12. A solenoid valve for a refrigerant circuit, comprising:
a hollow body having:
   an inlet for receiving refrigerant; and
   two outlets for discharging the refrigerant;
a particle filter fluidically communicating with said inlet; and
a valve body disposed inside said body for selectively opening and closing said outlets.

13. A solenoid valve for a refrigerant circuit, comprising:
a hollow body having:
   an inlet for receiving refrigerant; and
   two outlets for discharging the refrigerant;
a particle filter sieve fluidically communicating with said inlet;
a valve body disposed inside said body for selectively opening and closing said; and
a refrigerant drier fluidically communicating with said inlet, said refrigerant drier and said body forming a structural unit, said particle filter sieve being part of said refrigerant drier.

14. The solenoid valve according to claim 13, wherein:
said refrigerant drier has a drying agent chamber; and
said sieve is disposed between said drying agent chamber and said inlet.

15. The solenoid valve according to claim 14, wherein said refrigerant drier has a one-part tube-shaped housing with at least one end and said end of said tube is connected to said inlet.

16. The solenoid valve according to claim 14, wherein said housing narrows toward said end.

17. The solenoid valve according to claim 15, wherein said housing is narrowed by forming toward said end.

18. The solenoid valve according to claim 13, wherein:
said hollow body is a tubular housing with two ends;
said two outlets are respectively disposed at each of said two ends; and
said hollow body narrows toward each of said two ends.

19. The solenoid valve according to claim 13, wherein said at least one outlet is a capillary.

20. A solenoid valve for a refrigerant circuit comprising:
a hollow body having;
   an inlet for receiving refrigerant;
   at least one outlet for discharging the refrigerant; and
a refrigerant drier fluidically communicating with said inlet, said refrigerant drier and said body defining a structural unit, and a particle filter being part of said refrigerant drier and fluidically communicating with said inlet.

* * * * *